United States Patent [19]

Watson et al.

[11] Patent Number: 4,829,703

[45] Date of Patent: May 16, 1989

[54] AUXILIARY FLUE FOR FURNACES

[75] Inventors: James E. Watson, Southgate, Mich.; Theodore E. Davies, Hudson, Ohio

[73] Assignee: Gas Research Institute, Chicago, Ill.

[21] Appl. No.: 227,436

[22] Filed: Jul. 29, 1988

Related U.S. Application Data

[63] Continuation of Ser. No. 81,350, Aug. 4, 1987, abandoned.

[51] Int. Cl.$^4$ .............................................. F27D 17/00
[52] U.S. Cl. .................................... 432/181; 110/162
[58] Field of Search .................. 432/179, 180, 181; 110/162

[56] References Cited

U.S. PATENT DOCUMENTS

| | | |
|---|---|---|
| 2,049,478 | 8/1936 | Vierow . |
| 3,207,493 | 9/1965 | Swain . |
| 4,000,962 | 1/1977 | Hemingway et al. . |
| 4,245,569 | 1/1981 | Fallon, III ...................... 110/162 X |
| 4,426,360 | 1/1984 | Benedick . |
| 4,501,318 | 2/1985 | Hebrank . |
| 4,528,012 | 7/1985 | Sturgill .......................... 432/181 X |

FOREIGN PATENT DOCUMENTS 910103  4/1954  Fed. Rep. of Germany ...... 432/181

Primary Examiner—Edward G. Favors
Attorney, Agent, or Firm—Woodling, Krost and Rust

[57] ABSTRACT

An auxiliary flue is disclosed to vent contaminants from a regenerative burner furnace during secondary operations so as to avoid damage to the burners from such contaminants.

16 Claims, 4 Drawing Sheets

AUXILIARY FLUE FOR FURNACES

This is a continuation of co-pending application Ser. No. 81,350 filed on Aug. 4, 1987 now abandoned.

BACKGROUND OF THE INVENTION

This present invention relates to an auxiliary flue to vent harmful pollutants and contaminants during secondary operations in furnaces. The invention is described in the preferred atmosphere of furnace with bi-directional regenerative burners.

Furnaces have been utilized for centuries for heating objects. The stereotype furnace is an enclosure directly heated by the products of combustion from a burner before discharge of such products through a stack. This furnace serviceably heats anything in the enclosure. This type of furnace is acceptable to persons who do not particularly concern themselves with economies of operation, temperature stabilities or with governmental pollution regulations. However, persons with concerns in these areas cannot tolerate the operating characteristics of stereotype furnaces. With increasing foreign competition it is important that furnaces operate efficiently—and this calls for regenerative or recuperative burners. With ever tightening manufacturing tolerances it is important that the temperature of the furnaces be tightly controlled—and this calls for burners performing as designed. With governmental pollution regulations it is important that furnaces operate reliably and consistently—and this calls for furnaces uniformly meeting of all operating parameters. The stereotype furnace is unable to always meet these requirements due to many factors—one of which is the build-up of pollution and contaminants within the burners, furnace, pollution control equipment and stacks due to secondary treatment manufacturing operations on the material within the furnace. These contaminants also limit the in-service life of furnaces by plugging up the regenerative beds and other parts of the furnace.

SUMMARY OF THE INVENTION

The invention of this present application is directed towards alleviating the build-up of pollution and contaminants from secondary manufacturing operations by venting them separately of the ordinary production discharge of the products of combustion of the furnace burner.

It is an object of this invention to avoid the problems associated with contaminants from secondary operations on furnace parts.

It is an object of this invention to increase the service life of regenerative burners by reducing the plugging of the regenerative beds of such burners.

It is an object of this invention to increase the usability and reliability of regenerative furnaces.

It is an object of this invention to increase the efficiency of regenerative burners.

Other objects and a more complete understanding of the invention may be had by referring to the following specification and drawings in which:

DETAILED DESCRIPTION

The regenerative furnace 10 of the figures includes a furnace chamber 11, two regenerative burners 12, 13 and an auxiliary flue 14.

The furnace chamber 11 is designed to hold the material to be heated. The furnace chamber 11 shown in the preferred embodiment is designed to process aluminum and as such is a refractory chamber approximately fourteen feet long, nine feet wide and seven feet high having a volume of about 900 cubic feet. The melt rate for the furnace is some twenty-thousand pounds an hour with a charge rate (for aluminum) of some one-hundred and sixty-thousand pounds for every twenty-four hour period.

Figure 6:
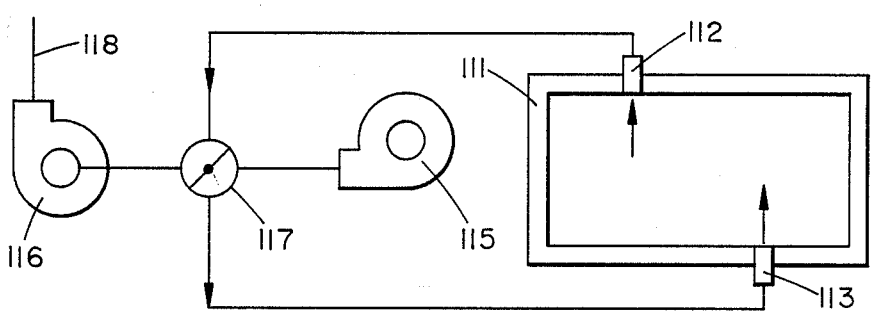
FIG. 6 is a block diagram representation of a typical regenerative furnace.

In a typical installation this furnace chamber may be heated by a pair of regenerative burners 112, 113 such as shown in FIG. 6. These two regenerative burners 112, 113 are selectively alternatively connected to an air blower 115 and exhaust fan 116 through the four way valve 117. The burner 112, 113 connected to the air blower 115 is fired with the products of combustion thereof as well as any pollution and contaminants produced during the particular manufacturing operation discharging through the inactive opposing burner 112, 113, the exhaust fan 116 and the stack 118. This type of operation—100% of everything discharged at all times through the opposing inactive burner 112, 113 and stack 118—is plagued with problems such as plugging (due to the contaminants from secondary operations building up during discharge), inefficient operation (due to the use of a single sized discharge passage) and shortened service life (due to heat mal-distribution attributable to contaminant buildup). These problems are undesirable. The invention of this present application is directed towards alleviating these problems.

Figure 7:
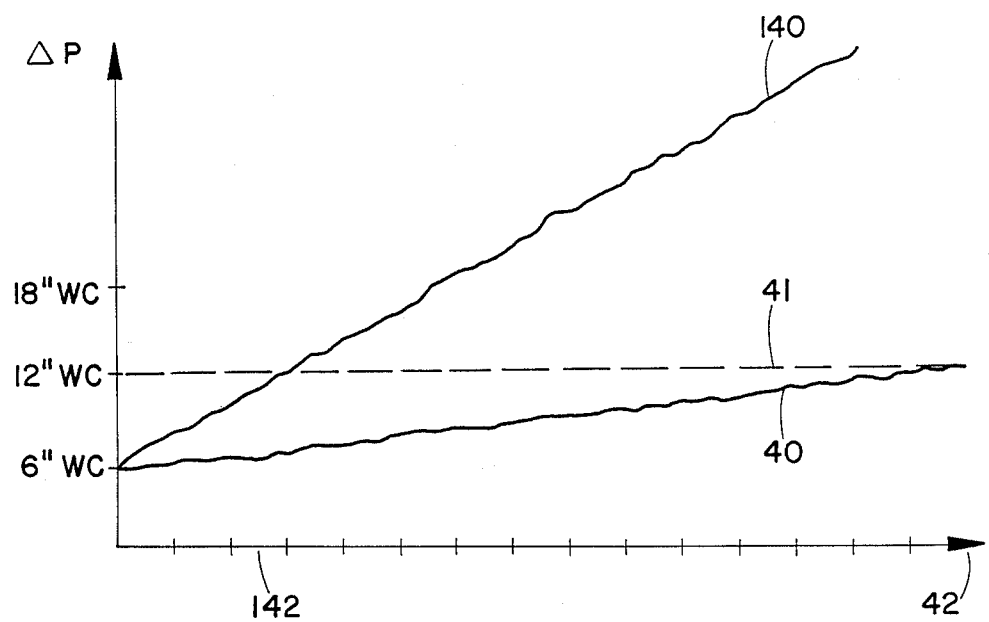
FIG. 7 is a graph of the operational characteristics of the alternate flue furnace of FIG. 2 in contrast with the operational characteristics of a typical regenerative furnace.

The preferred embodiment of the invention of this present application is described in the atmosphere of a furnace for melting aluminum. If all an aluminum furnace did was melt scrap, the typical regenerative furnace of FIG. 6 would be satisfactory; it is possible to optimize a furnace for a particular single operation, especially when that operation is providing heat (i.e. avoid the problems from secondary operation's contaminants by never doing the secondary operations in the first place). However, unfortunately for the typical furnace, there are multiple operations involved in most furnaces including the example aluminum furnace. One operation (in an aluminum furnace), fluxing, is particularly damaging to regenerative furnaces. In this fluxing operation the operator adds a substance to the melt to facilitate the fusing of the metals in the furnace. In our example aluminum furnace some eleven-thousand two-hundred pounds of flux is used in two periods over the twenty-four hour furnace cycle. The flux itself consists of five-thousand three-hundred seventy-six pounds of sodium chloride, an equal amount of potash and four-hundred forty-eight pounds of aluminum fluoride. This fluxing operation produces contaminants that quickly plug up the beds of the regenerative burners in the furnace. (The sodium chloride makes magnesium chloride, sodium chloride and aluminum chloride. The aluminum fluoride removes magnesium from aluminum and makes magnesium chloride.) With this fluxing operation, a typical furnace could be operated for only a few charging cycles before the regenerative beds would plug up from the contaminants produced during this secondary operation. The graph of FIG. 7 plots the increase in pressure across a particular bed against the number of charging cycles. In this furnace the pressure increases from an initial six inches of water to twelve inches in only two or three charging cycles (line 140). As twelve inches is the plugging limit 41 for the particular bed charted, the beds have to be removed for cleaning after this same number of cycles (at 142). Removal entails shutting down the furnace for a cool-down and start-up period in addition for the actual time of cleaning. This time, about two hours per removal, is forever lost to manufacture—compromising the efficiency of a typical furnace severely. This inefficiency is directly related to the contaminant build-up in the beds that occurs during the secondary operation. Industry puts up with this inefficiency due to the lack of alternatives.

The alternate flue of this present invention provides a preferable alternative to this typical installation.

Figure 1:
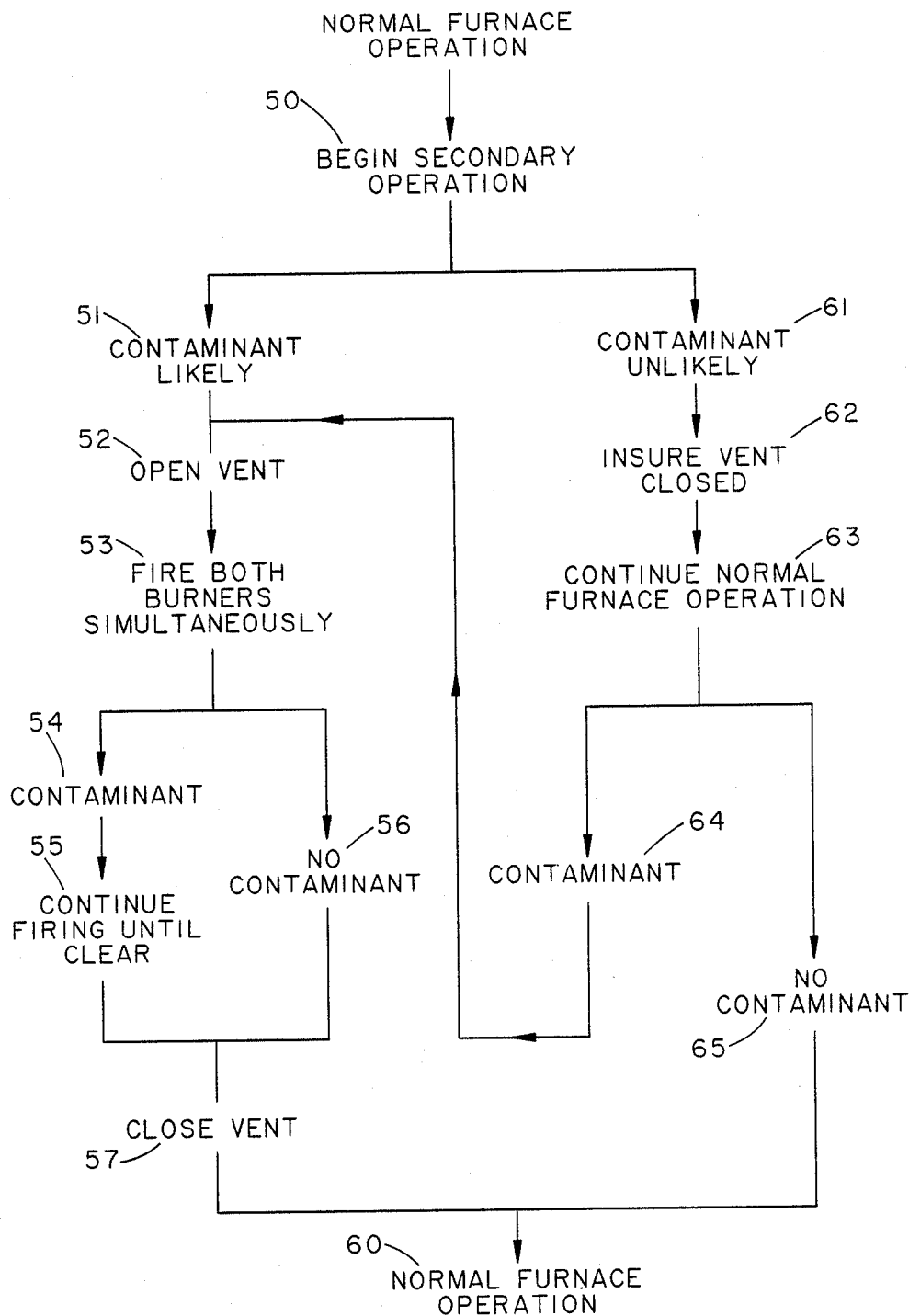
FIG. 1 is a block diagram representation of the flow chart operation of a regenerative furnace incorporating the alternate flue of the invention.

The furnace chamber 11 of the present invention is provided with an auxiliary vent 14. This vent 14 allows the pollution and contaminants from secondary operations to be vented from the furnace chamber 11 otherwise than through the regenerative burners 12, 13 and associated components. This venting is selectively operated to optimize the operation of the furnace. (FIG. 1)

Sometime during the normal operation of a furnace an operator conducts a secondary operation on a material in a furnace chamber 11 (50). At the time of the secondary operation, the operator should have a pretty good idea of whether or not the secondary operation should or should not produce contaminants (based upon past experience, manufacturing guidelines and other sources). The operator should therefor know whether contaminants are likely or unlikely from the secondary operation.

If contaminants are likely (51) (as for example in the fluxing operation in the example aluminum furnace), the operator opens the auxiliary vent 14 (52) and operates the burner controls to fire both burners 12, 13 simultaneously (53). (The firing of both burners is preferred due to its optimization of burn-off of the contaminants and in the inherent elimination of the need to valve or otherwise protect the inactive burner and its regenerative bed from the contaminants. The same effect, albeit at a slower rate, would also occur if only one burner was used with the vent 14.) If the secondary operation produces contaminants (as expected in a fluxing operation—54) the operator continues firing the burners 12, 13 until the auxiliary flue 14 vents all contaminants from the secondary operation (55). At this point, or if the firing of both burners produces an unexpected result of no contaminants (56) (totally unexpected in a fluxing operation but possible with other secondary operations), the operator closes the auxiliary vent 14 (57) and operates the burner controls again in the normal production manner (60)—(in this instance alternating single burner operation).

If contaminants are unlikely (61) (as for example in a purging of an aluminum furnace), the operator insures that the vent 14 is closed (62) and continues the normal operation of the furnace (63). If the continued normal operation of the furnace produces an unacceptable (and unexpected) level of contaminants (64) (i.e. a pocket of flux arises to the surface of the melt of aluminum) the operator immediately opens the auxiliary vent 14 (52) and proceeds as if contaminants were originally expected. If the firing of the burner produces no contaminants (65), the operator continues the normal furnace operation (60).

During the normal operation of the furnace it is possible that a fluxing or other secondary operation will again take place in the furnace. If so the operator treats the furnace immediately after this new secondary operation as if it was the first, making again the decision of whether or not contaminants are likely (from the new secondary operation) and proceeding accordingly (i.e. returning to choice 51, 61).

With a furnace operation including the auxiliary venting of contaminants from secondary operations, the pressure drop across the regenerative burners 12, 13 remains relatively constant even through repeated charging cycles (line 40 in FIG. 7). In a furnace equivalent to that of our previous example but utilizing the auxiliary flue 14 of the invention for venting contaminants from a secondary fluxing operation, the furnace can be operated for many times the number of charging cycles (14 instead of 2 in the graph) before the plugging limit of twelve inches of water is realized and the regenerative bed must be removed for cleaning (at 42). This increase in number of charging cycles is directly reflected in the overall operating efficiency of the furnace.

Figure 2:
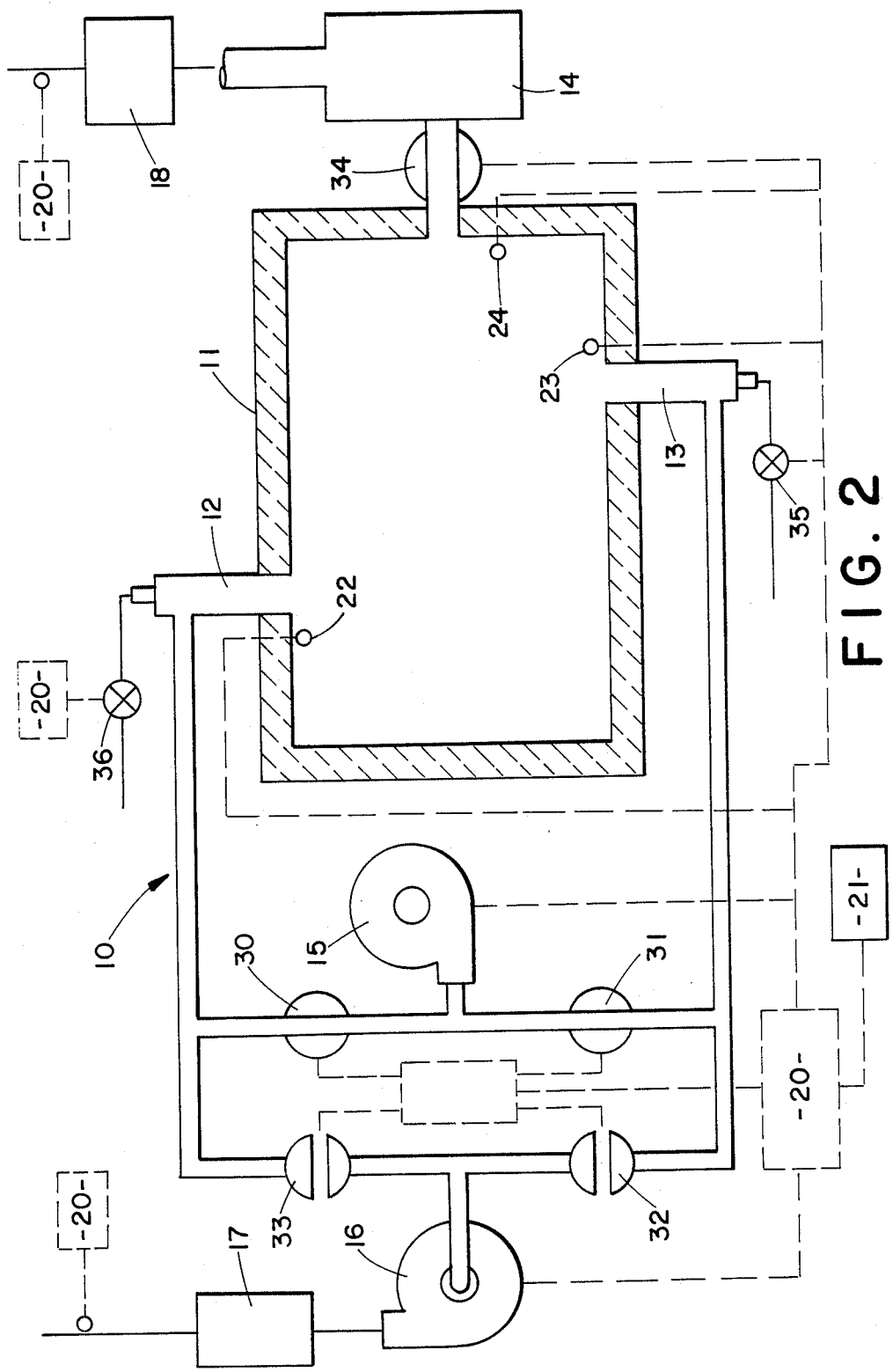
FIG. 2 is a conceptual block diagram of a regenerative furnace incorporating the alternate flue of the invention.

The operation of this furnace leaves a large measure of discretion with and responsibility on the operator of the furnace. However even the most conscious operator cannot produce a perfect operation, if only because some contaminants from secondary operations are invisible to human senses. The operation of the furnace can be facilitated to virtual perfection by the use of sensors to measure the various levels of contaminants and by the use of automatic controls dependent on such sensors to operate the furnace. In this regard the only decision the operator would have to make would be whether or not contaminants are likely (51, 61) from the secondary operation (and even this decision can be made by a carefully programmed computer). A preferred system designed with this in mind is shown in FIG. 2. The preferred furnace is fourteen feet long, nine feet wide and seven feet deep (900 cubic feet total). The furnace is made of refractory brick. The burners for this furnace are 13.5 million BTU (at 6" wc) regenerative burners. The burner intake blower is a 20 horsepower 12 ounce per square inch guage (O.S.I.G.) blower while the exhaust blower is a slightly larger 25 horsepower 20 O.S.I.G. blower.

The automatic control system of FIG. 2 incorporates a microprocessor control 20 with the preferred furnace 10. In this automatic system, the operator's main control over the furnace is via the operational parameters and the sensor limits the programs into the microprocessor (via the keyboard 21).

In the preferred embodiment the operator's primary input would be to program in the limits for the contaminant sensors 22, 23 and 24.

After initiation of the secondary operation and upon contaminant sensors 22, 23 at the openings of the regenerative burners 12, 13 sensing contaminants at or above this programmed level, the microprocessor 20 would automatically manipulate the intake 30-31, discharge 32-33, vent 34 and burner operation valves 35-36 to vent the contaminants from the secondary operation otherwise than through the regenerative burners 12, 13. Ordinarily this would mean closing the exhaust valves 32-33, opening the intake 30-31 and burner valves 35-36 and opening the vent valve 34 (as shown in FIG. 2). Both burners 12, 13 would then operate with all products of combustion and contaminants being discharged through the vent 14. Note that since the blower 15 is preferably sized to match normal production operating parameters—i.e. meeting 100% of the operating needs of a single burner at one time and then with the exhaust blower 16 also in operation—this simultaneous burner 12-13 operation may tax the capabilities of the blower 15: the burners 12, 13 would have a restricted and inefficient operation. As our concern is more with damage due to contaminants from a secondary operation than efficient production-type operation, this restricted operation is acceptable during the limited period of the secondary operation. If appropriate this restricted operation could be avoided by reducing the level of burner operation, through the use of an auxiliary supplementary means such as a high speed capability to the blower 15, via the use of but a single burner (still venting via vent 44) or otherwise adapting the system to meet the need of the system during the venting operation. The venting of contaminants from the secondary operation would continue until the level of contaminants being discharged through the vent 14 is at an acceptable level (as determined by the sensor 24 later described). During this period of discharge through the vent 14, the contaminants are preferably treated by a pollution control system (electrostatic participator for example) before discharge into the air. A separate pollution control system 18 is preferred in that it can be designed especially for the vented contaminants from the secondary operation (instead of the normally different range of operational pollutants). (The existing pollution system 17 for the furnace could also be used instead of/in addition to the separate system 18).

Figure 3:
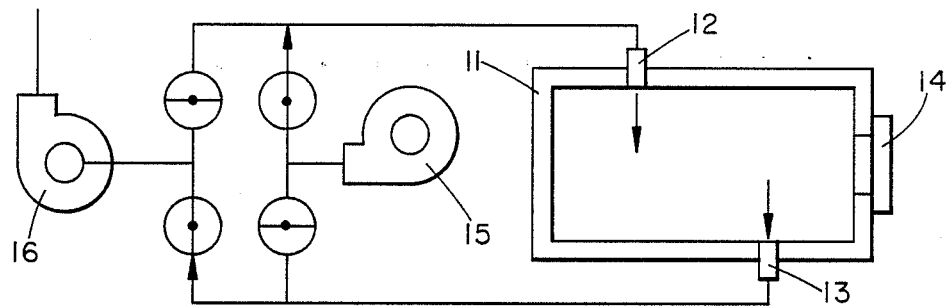
FIGS. 3-5 are representations of the conceptual block diagram of FIG. 2 showing the furnace under varying operating conditions.
Figure 4:
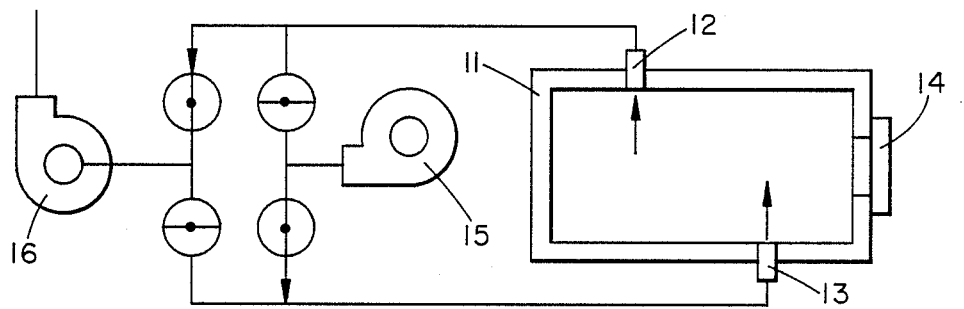
Figure 5:
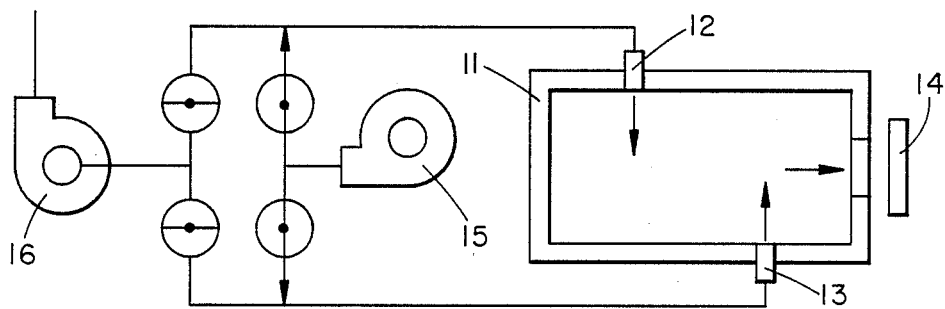

The vent 14 remains open and the furnace 10 in its venting mode until the venting sensor 24 determines that the level of contaminants being vented from the secondary operation has reached the level the operator has programmed as acceptable. At this time the microprocessor 20 would automatically manipulate the intake 30-31, discharge 32-33, vent 34 and burner operation valves 35-36 to control the operation of the furnace 10 in its typical manner (i.e. alternating operation of the regenerative burners 12, 13 with the inactive burner 12, 13 used as a discharge as shown in FIGS. 3 and 4).

The microprocessor 20 is quick enough to alter the settings of the controls of the furnace 10 virtually immediately in response to the sensors 22, 23, 24. This type of immediate operation could disturb the functional efficiency of the furnace during the secondary operation (by changing its mode on even transitory contaminant levels within the furnace) and its longevity (by operating the controls repeatedly at frequent intervals). To avoid the problems that may be associated with the instantaneous response of the microprocessor 20, it is preferred that some sort of a delay be incorporated, ideally limiting the operation of the controls until the level of contaminants has been above (or below) the programmed level for a certain period of time or until the expected contaminants from the secondary operations have had a sufficient opportunity to appear. The period of time would be chosen as a compromise between the physical damage caused by the contaminants vs. the potential loss of the operational production efficiency of the furnace (i.e. damage to the discharge passage through the burners 12, 13 against the cost of the loss of efficiency regeneration). Therefor, although the invention has been described in its preferred form with a certain degree of particularity, it is to be understood that numerous changes may be made without deviating from the invention as hereinafter claimed:

What is claimed is:

1. In a furnace with a burner heating a furnace chamber having an operational discharge and the operation of the furnace occasionally including a secondary operation producing physical contaminants harmful to part of the operational discharge, an improvement comprising an auxiliary vent and means to selectively operate said auxiliary vent to allow the physical contaminants from the secondary operation to depart the furnace chamber independently of the part of the operational discharge of the furnace that would be harmed by the physical contaminants.

2. In a furnace with regenerative burners heating a furnace chamber having an operational discharge with part of the operational discharge being through an inactive regenerative burner and the operation of the furnace occasionally including a secondary operation producing physical contaminants harmful to part of the operational discharge, an improvement comprising an auxiliary vent and means to selectively operate said auxiliary vent to allow the physical contaminants from the secondary operation to depart the furnace chamber independently of the part of the operational discharge of the furnace that would be harmed by the physical contaminants.

3. The improved furnace of claim 1 wherein the contaminants are customarily produced in an externally controlled secondary operation in the furnace and characterized in that said auxiliary vent is open on initiation of the externally controlled secondary operation in the furnace.

4. In a furnace with two regenerative burners heating a furnace chamber with the burners alternatively firing into and discharging products of combustion from the furnace chamber into an operational discharge and the operation of the furnace occasionally including a secondary operation producing physical contaminants harmful to part of the operational discharge, an improvement comprising an auxiliary vent and means to selectively operate said auxiliary vent and fire the two burners during the period of open operation of said auxiliary vent to allow the physical contaminants from the second operation to depart the furnace chamber independently of the part of the operational discharge of the furnace that would be harmed by the physical contaminants.

5. In a furnace with two regenerative burners alternatively heating a furnace chamber with products of combustion discharged thereinto, the products of combustion operationally discharged from the furnace chamber through an inactive burner, and the secondary operation in the furnace producing physical contaminants harmful to the operational products of combustion discharge through the inactive burner, the improvement of an auxiliary vent, means to selectively operate said auxiliary vent to allow the physical contaminants from the secondary operation to depart the furnace chamber independently of the inactive burner and means to selectively limit the operational discharge of the products of combustion through the inactive burner such that the contaminants from the secondary operation and products of combustion are discharged from the furnace chamber through said auxiliary vent during the period of the secondary operation.

6. The improved furnace of claim 5 characterized in that said means to selectively limit the operational discharge of the products of combustion through the inactive burner comprises the firing of such inactive burner.

7. The improved furnace of claim 5 wherein the contaminants are customarily produced in an externally controlled secondary operation in the furnace and characterized in that said auxiliary vent is open on initiation of the externally controlled secondary operation in the furnace.

8. The improved furnace of claim 5 characterized by the addition of a sensor means to sense the level of contaminants in the furnace chamber during the secondary operation and said means to selectively operate said auxiliary vent is responsive to said sensor means.

9. The improved furnace of claim 5 wherein the operational discharge from the furnace chamber through an inactive burner includes an exhaust blower and characterized by the addition of means to deactivate the exhaust blower during the operation of said auxiliary vent.

10. An improved method for operating a furnace having a burner and an operational discharge, the operation of the furnace occasionally including a secondary operation producing physical contaminants, the method comprising the steps of firing the burner with the operational discharge limited and an auxiliary flue open during the period of production of the physical contaminants in the secondary operation.

11. An improved method for operating a furnace having a burner and an operational discharge through an inactive burner, the operation of the furnace occasionally including a secondary operation producing physical contaminants, the method comprising the steps of firing the burner with the operational discharge limited by firing the burner the operational discharge is through and with an auxiliary flue open during the period of production of the physical contaminants in the secondary operation.

12. The improved method of claim 10 wherein there is an exhaust blower that pulls air through operational discharge and characterized in that said exhaust blower does not pull air through the operational discharge substantially during the time the auxiliary flue is open.

13. An improved method of operating a furnace having two regenerative burners alternatively firing into and discharging products of combustion from a furnace chamber, the operation of the furnace occasionally including a secondary operation producing physical contaminants harmful to the discharge passage through the inactive burner, the method comprising the step of firing one burner while limiting the discharge through the other burner and opening an auxiliary flue during the period of production of the physical contaminants in the secondary operation with the result that the harmful physical contaminants from the secondary operation are discharged from the furnace chamber through the auxiliary flue instead of the inactive burner.

14. The method of claim 13 characterized in that the discharge through the inactive burner is limited by the firing of such burner.

15. The improved method of claim 13 wherein there is an exhaust blower that pulls air through operational discharge and characterized in that said exhaust blower does not pull air through the operational discharge substantially during the time the auxiliary flue is open.

16. The method of claim 13 characterized in that the operation of the auxiliary vent is under the control of a sensor that determines the level of physical contaminants in the furnace chamber during the secondary operation.

* * * * *